United States Patent Office 2,738,615
Patented Mar. 20, 1956

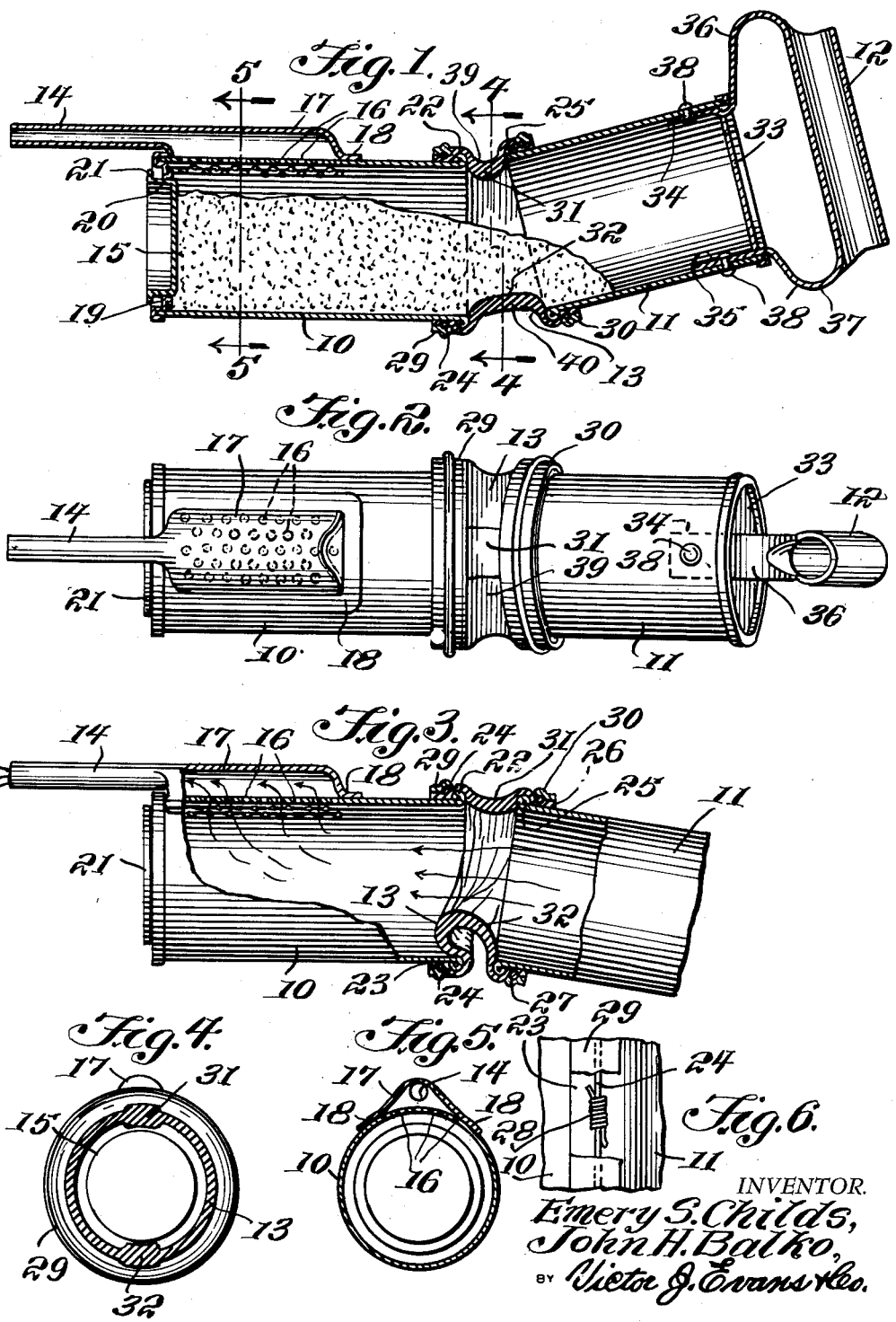

2,738,615
HAND OPERATED INSECT DUSTER

Emery S. Childs and John H. Balko, Kingsville, Tex.

Application January 29, 1953, Serial No. 333,916

2 Claims. (Cl. 43—146)

This invention relates to devices for spraying insect powder, and in particular a pair of tubular casings connected with a flexible sleeve with a handle extended from one of the casings and a nozzle extended from the other whereby flexing the joint between the tubular casings increases and decreases the area within the casings thereby providing a pump action which forces insect powder in the device through the nozzle.

The purpose of this invention is to provide an insect duster that is adapted to be held and operated with one hand.

Various types of spray devices have been used for dusting insect powder and the like. In these devices however, it is necessary to hold the barrel or casing of the device with one hand and operate a plunger with the other and, as in numerous cases it is desirable to hold leaves of plants back to reach insects on the under surfaces, it is desirable to provide a duster that may be actuated with one hand. With this thought in mind this invention contemplates a device for dusting insect powder in which a swinging movement of the device causes a pumping action that forces insect powder from a nozzle at one end of the device.

The object of this invention is, therefore, to provide means for forming an insect powder duster whereby the device is adapted to be held and actuated with one hand.

Another object of the invention is to provide a spray device in which the conventional plunger is eliminated.

A further object of the invention is to provide a dusting or spraying device particularly adapted for insect powder in which the device is of a simple and economical construction.

With these and other objects and advantages in view the invention embodies a pair of tubular members with a friction plug in the end of one member and a tubular nozzle extended from the member in which the plug is positioned, with a handle on the extended end of the other member and with the members connected with a flexible sleeve.

Other features and advantages of the invention will appear from the following description taken in connection with the drawing, wherein:

Figure 1 is a longitudinal section through the insect powder duster showing one section of the device positioned at an acute angle in relation to the other section.

Figure 2 is a plan view of the duster.

Figure 3 is a side elevational view of the duster with parts broken away and with parts shown in section and in which the parts are adapted to be actuated whereby a section of the flexible member extends into the area between the tubular members.

Figure 4 is a cross section through one member of the duster taken on line 4—4 of Fig. 1.

Figure 5 is a cross section through the tubular member on which the nozzle is positioned being taken on line 5—5 of Fig. 1.

Figure 6 is a detail illustrating a wire clamp for securing one of the ends of the flexible members to one of the tubular members.

Referring now to the drawing wherein like reference characters denote corresponding parts, the improved insect duster of this invention includes a tubular casing 10 in which insect powder may be positioned, a tubular casing 11 on the extended end of which a handle 12 is provided, a flexible sleeve 13 connecting the casings, a spout 14 mounted on and extended from the casing 10 and providing a nozzle, and a filling plug 15.

One side of the tubular casing 10 is provided with perforations 16 and an enlarged base 17 of the spout or nozzle 14 is positioned over the perforations with a flange 18 secured to the outer surface of the casing 10 by welding, brazing, or other suitable means.

The extended end of the tubular casing 10 is provided with a head 19 in which the plug 15 is frictionally held, the plug 15 having a cylindrical wall 20 that nests in the opening of the head and an annular flange 21 which provides means for removing the plug.

The opposite end of the tubular casing 10 is provided with a bead 22 over which an end portion 23 of the sleeve 13 is secured with a wire clamp 24. The adjoining end of the handle casing 11 is provided with a similar bead 25 and an end portion 26 of the sleeve 13 is secured over the bead and held to the tubular casing 11 with a wire clamp 27. The ends of the wire clamps are twisted together as shown at the point 28 in Fig. 6 and the ends of the sleeve are provided with covering rings 29 and 30.

The sleeve 13 may be provided with reinforcing sections 31 and 32, as shown in Fig. 4, to increase the life thereof. The reinforcing sections 31 and 32 also retain the casings 10 and 11 in normal angular relation to each other when the duster is not in use.

The extended end of the tubular casing 11 is provided with a closure or end plate 33 and ends 34 and 35 of sections 36 and 37, respectively of the tubular handle 12 extend through the plate 33 and are secured to the casing 11 with fasteners, such as rivets 38.

As illustrated in Figs. 1 and 3 the sleeve 13 is provided with a short side, as indicated by the numeral 39 and a long side, as indicated by the numeral 40 whereby as the casings swing with a hinge action the long side or portion 40 of the sleeve extends into the area between the casings as illustrated in Fig. 3.

With the parts formed in this manner, powder, such as insect powder may be positioned in the device, as shown in Fig. 1 and with the opening in the head 19 closed with the plug 15 the device may be held by the handle 12 and with the tubular casing 11 held, the casing 10 may swing to actuate the rubber or flexible sleeve, whereby the area within the two casings is increased and reduced and as the area is reduced powder is discharged through the spout or nozzle 14.

It will be understood that the sleeves or tubes may be formed of suitable material.

It will also be understood that modifications, within the scope of the appended claims, may be made in the design and arrangement of the parts without departing from the spirit of the invention.

What is claimed is:

1. An insect powder duster comprising a pair of tubular casings, a flexible sleeve connecting said casings, one of said casings having a plurality of perforations in the wall thereof and a nozzle having an enlarged base provided with a peripheral flange positioned on said one of said casings over the perforations, said one of said casings having a filling plug therein, and the casing opposite to that on which the nozzle is positioned having a handle thereon, said flexible sleeve having a short side and a long side whereby the tubular casings are angularly positioned, and reinforcing sections provided in said short and long side of the sleeve to retain the tubular casings in angular relation to each other when the duster is in the free position, and said reinforcing sections being formed integral with the flexible sleeve.

2. In a spray device, the combination which comprises a pair of tubular casings, a flexible sleeve positioned with one end over an end of one of said tubular casings and with the other end over an end of the other tubular casing, means clamping the ends of the flexible sleeve to the casings, a handle positioned on one of said tubular casings, a filling plug positioned in an opening in one of said casings, said last mentioned casing having a plurality of perforations in the wall thereof, a spout having an enlarged base provided with a peripheral flange positioned on the last mentioned casing over the said perforations so that the forward end of the spout is extended from the said last mentioned casing, and said flexible sleeve is provided with oppositely disposed reinforcing sections to retain the casings in normal angular relation to each other when not in use, said reinforcing sections being formed integral with the said flexible sleeve.

References Cited in the file of this patent

UNITED STATES PATENTS

| | | |
|---|---|---|
| 37,923 | Roe | Mar. 17, 1863 |
| 154,149 | Paget | Aug. 18, 1874 |
| 2,206,208 | Thomas | July 2, 1940 |
| 2,349,875 | Mandlak | May 30, 1944 |
| 2,491,118 | Lee | Dec. 13, 1949 |

FOREIGN PATENTS

| | | |
|---|---|---|
| 813,909 | Germany | July 19, 1951 |